United States Patent

[11] 3,584,793

| [72] | Inventors | Karl F. Ilzig<br>Hanau;<br>Klaus Junginger, Niederrodenbach, both of, Germany |
|---|---|---|
| [21] | Appl. No. | 879,019 |
| [22] | Filed | Nov. 24, 1969 |
| [45] | Patented | June 15, 1971 |
| [73] | Assignee | Original Hanau Quarzlampen GmbH<br>Hanau, Germany |
| [32] | Priority | Nov. 23, 1968 |
| [33] | | Germany |
| [31] | | P 18 10 552.7 |

[54] SWINGABLE JOINT FOR LOAD SUSPENSION, PARTICULARLY FOR USE IN ASEPTIC SURROUNDINGS
6 Claims, 3 Drawing Figs.

[52] U.S. Cl. .................................................. 240/41.15,
240/1.4, 240/52, 248/78
[51] Int. Cl. .................................................. A61b 1/06
[50] Field of Search ........................................... 240/41.15,
1.4, 52, 69, 71, 81, 78; 248/278, 280, 281, 284

[56] References Cited
UNITED STATES PATENTS

| 2,834,568 | 5/1958 | Foster | 248/280 |
| 3,374,347 | 3/1968 | Hirose | 248/284 X |

Primary Examiner—Samuel S. Matthews
Assistant Examiner—Richard L. Moses
Attorney—Flynn & Frishauf ABSTRACT: To support operating room lights or the like from a ceiling, a joint is provided interconnecting a pair of half shells, one arm, for example mounted on a ceiling, extending from one shell side and the other arm, for example supporting an operating room light, extending from the other shell side, with both shells having matching, circular surfaces facing each other, preferably lapped, or ground to provide for free rotation, and direct access for cleaning and maintenance in aseptic condition. One of the arms is preferably spring loaded, and access to the internal spring-loading mechanism can be had through openings, closed off by cover plates, through the shells.

SWINGABLE JOINT FOR LOAD SUSPENSION, PARTICULARLY FOR USE IN ASEPTIC SURROUNDINGS

The present invention relates to a support joint for movable suspension of equipment, such as operating room lights, in aseptic surroundings, and more particularly to such a construction which permits ready cleaning and maintenance in aseptic condition, yet allows counterbalancing by means of spring loading of heavy, suspended equipment.

The customary form of rotating, or movable joints, having a substantially horizontal pivoting axis to suspend medical apparatus, particularly operating room lights, utilized a construction in which the ends of the suspension arms were arranged in interlocking fashion like hinges. A spring loading, to counterbalance the weight of the supported equipment can then readily be applied to lever arms located inside the hinge construction. Such an arrangement while being suitable for general suspension of heavy appliances presents to the outside a pair of mutually movable joints which between themselves necessarily must have some distance, that is a gap, to permit relative rotation. This gap, or joint is undesirable in aseptic surroundings since it provides a point in which dust and dirt can collect, and thus attract, and keep bacteria; such joints, particularly after having been in use for some time, are very difficult to clean and keep aseptic. If the arms are moved over wide arcs, portions of the interior of the joint which cannot be kept aseptic may become exposed to the outside. Such joints thus present places where germs and bacteria may nest—a condition which is intolerable in operating rooms.

It is an object of the present invention to provide a joint which remains totally closed at all times, even if arms attached to portions of the joints are swung over wide arcs, and which is further so constructed that it does not provide any gaps or points where bacteria may collect, and will not expose any portions of the interior of the joint mechanism during movement of the elements of the joint relative to each other.

SUBJECT MATTER OF THE PRESENT INVENTION

Briefly the joint is formed of a pair of attachment sections, one of them adapted to be mounted on a ceiling, for example, and the other to secure an operating room light. A generally horizontally extending shaft is mounted in the joint, to provide for swinging movement of one of the attachment arms, in a vertical plane, with respect to the other. The attachment sections, to which the arms are secured, are offset relative to each other and may be in the form of shells, which have mutually facing, abutting surfaces which match and fit closely against each other. In a preferred embodiment, the fitting, matching surfaces are ground or lapped so that they will work smoothly against each other while still fitting snugly and preventing accumulation of dirt, dust, or the like, and present an easily cleaned smooth outer contour. The attachment sections can retain, on the inside, a mechanism for spring-loaded support of an operating room light and for electric wires to provide the necessary power for the light.

The construction of a joint having abutting, matching fitted edges has the additional advantage that the angle over which the joint portions can be moved relative to each other can be g greatly increased over the angle of joints which have a hinge construction. Thus, the suspension of the operating room light on one of the joints provides for great freedom of movement and there is no theoretical limitation to the placement of the operating room light given a ceiling suspension of one portion of the joint. Additionally, the weight of the operating room light itself can be counterbalanced in all positions of the portions of the joint.

The invention will be described by way of example with reference to the accompanying drawings, wherein.

Figure 1:
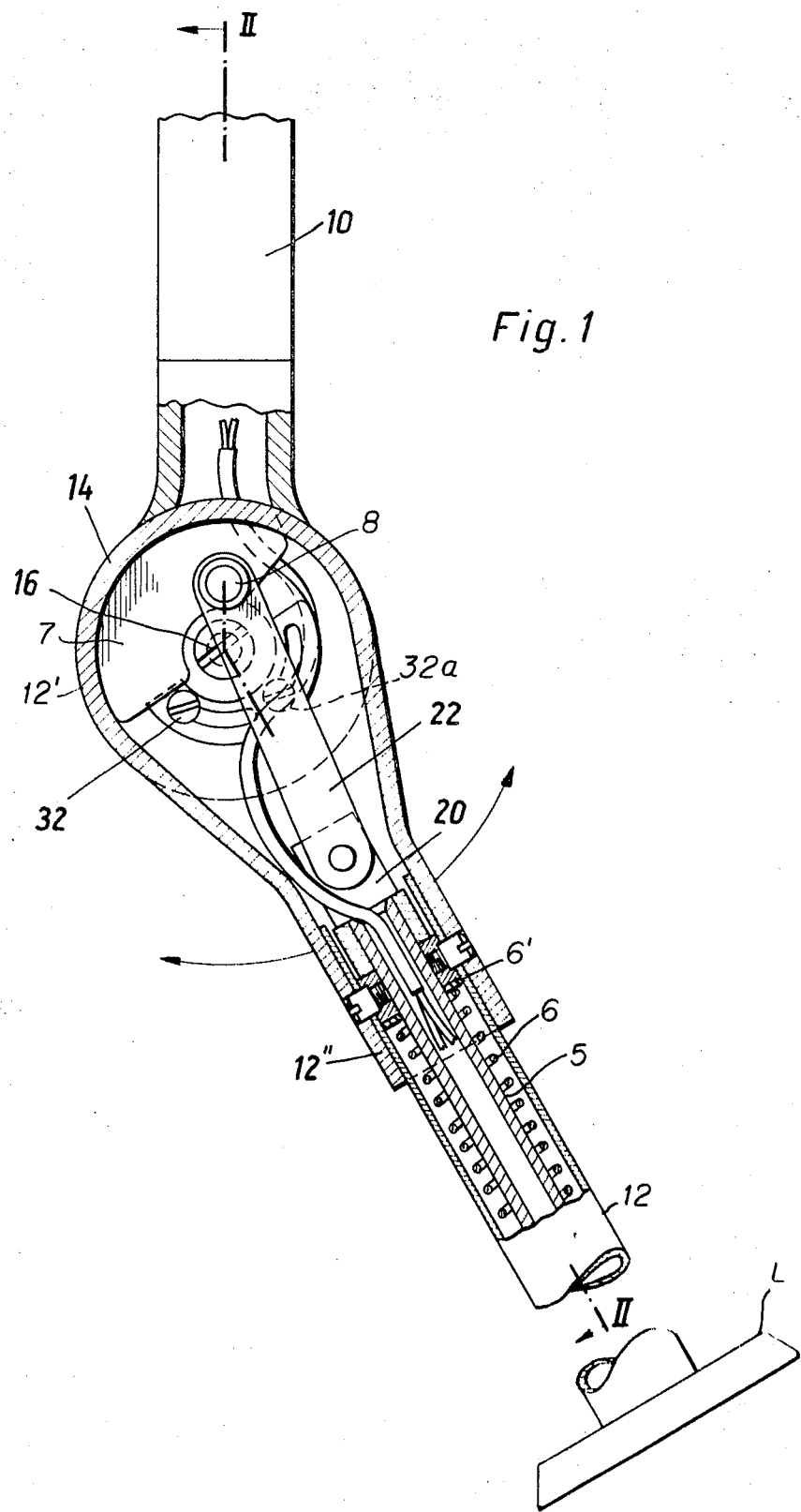
FIG. 1 is a longitudinal cross-sectional view through the joint.
Figure 2:
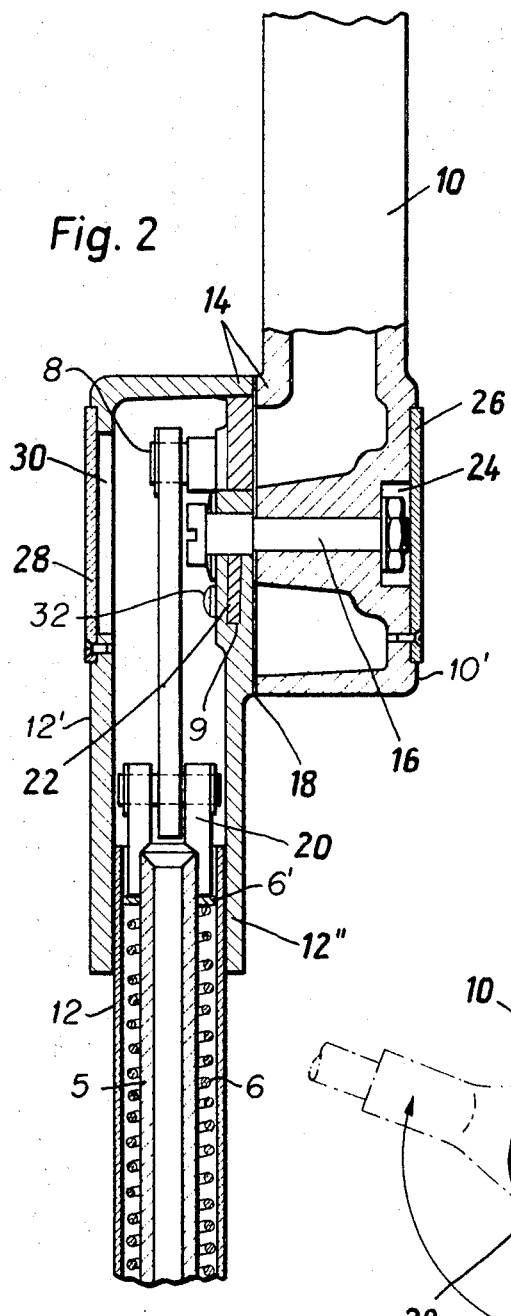
FIG. 2 is a cross-sectional view along line II–II of FIG. 1.

The invention will be described in connection with a ceiling suspension for an operating room light, in which neither the ceiling nor the light itself are shown. One arm, 10, is directed towards the ceiling and can be assumed to be attached thereto, whereas another arm, 12, can be connected to a fork, or other suspension device to suspend an operating room light only schematically indicated at L. Arms 10, 12, are interconnected by means of a joint which is formed in a pair of shell portions 10', 12'. Internally of the shell is a holding bolt 16, forming a pin over which one joint portion 12' can turn with respect to joint portion 10', and extending generally in a horizontal plane. The joint structure itself contains a spring-loading arrangement to compensate for the weight of operating room light L and maintain the operating room light, in balance, at any desired location. To this end, shell 12' has an extension 12" which is connected to a tubular portion of arm 12; internal of the tubular portion is a guide tube 5, surrounded by a spring 6, bearing against the end of the arm 12. Spring 6 bears against an end washer 6' which is secured over a fork 20 to the balancing mechanism to be described.

The attachment portions, or shells 10', 12' have matching, circular zones 14 which are formed with smoothly fitting, matching, ground and lapped surfaces 18. The surfaces 18 form a completely circularly closed joint of the two attachment parts 10', 12', against each other. The arms themselves are axially offset from each other; if it is undesired to have the operating room light, itself, offset from attachment arm 10, arm 12 can be formed with a counterbalancing offset somewhere along its length. The arms, themselves, are totally closed up to the fitting surfaces 18, where they match against each other.

Each one of the shells 10', 12', is formed with an opening to provide access to the joint itself. Opening 30, in shell 12' is closed off by a cover plate 28, a cover plate 26 closing off an opening in shell 10' which permits access to a countersunk depression 24 in which bolt 16 is secured.

Figure 3:
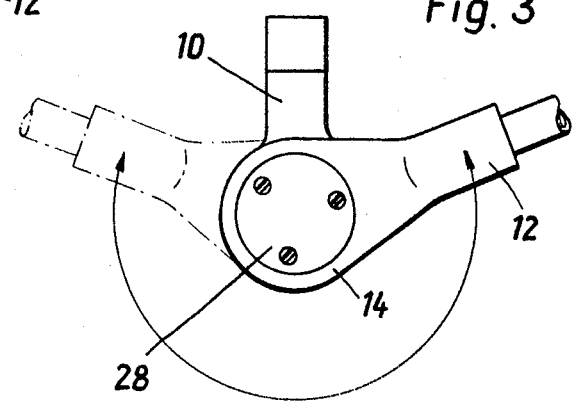
FIG. 3 is a schematic showing of the angle through which the joint parts can be moved with respect to each other.

Cover plate 28 permits access to the balancing mechanism for the spring loading—see FIG. 1. A circular sector element 7 has a link 22 connected thereto which connects to fork 20, against which spring 6 can bear. Link 22 acts as a lever; the action point of the lever, itself, is determined by tightening a screw 32, movable in a guide slot cut in an internally projecting extension 9 of shell 12'. A portion of sector 7, extending beneath the guide slot can thus be fixed in various locations, as illustrated by the different positioning of screws 32, or 32a. The link 22, itself, is connected to the sector 7 by pin 8. In order to change the spring compensation for the weight of the operating room light L, screw 32 is changed in position so that pin 8 will be offset with respect to the shaft 16 by a different amount, thus providing a new position for the effective, acting point of link 22 and different spring tension to the operating room light itself. The electrical wires to supply the operating room light are schematically indicated in FIG. 1 and can be guided through the joint in any convenient position. The joint itself can, theoretically, be so constructed that arm 12 can swing over an angle of 360°. The angle is limited only be the length of the guide slot, and the fact that the electric wires would be damaged if twisted. The extent of swinging motion of the arm 12 with respect to arm 10 can readily be seen in FIG. 3, that is from the solid line to the dashed line position. This is sufficient motion of the joint for all practical applications in operating rooms.

The shells 10', 12', are completely enclosed and thus no contaminants can escape from the inside of the joint to the operating room; the only relatively movable surfaces are abutting edges 18, matching each other and preferably lapped, and self-cleaning upon movement of the operating room light. The joint is entirely free of gaps, cracks, or other places where dust or dirt can collect and thus form sources of contamination.

Spring suspension of operating room lights, by and itself, is known—see for example German application No. 1,198,302, to which reference is made.

We claim:

1. Swingable load suspension joint for aseptic surroundings to be interposed between a pair of support arms comprising
- a first attachment section (10') to attach the joint to a first support arm (10);
- a second attachment section (12') to attach the joint to a second support arm (12);
- means securing said attachment sections together for relative swinging movement with respect to each other;
- each said attachment sections having, each, a single circular surface, the surfaces of said attachment sections being similar, abutting and facing each other and forming closed circles, said surfaces closely fitting and matching against each other to enable said swinging movement and to form a single closed discontinuity in the joint.

2. Joint according to claim 1 including a shaft (16) mounted in the joint adapted to be placed in a horizontal plane to provide for swinging movement of the attachment sections thereabout, in a vertical plane, with respect to each other, said shaft extending from one of said sections beyond the horizontal projection thereof;
- means (9) journaling the other section about said shaft;
- and load-balancing means in said joint to balance the weight of the load attached to one of said arms, said balancing means being encapsulated within said arms and said joint.

3. Joint according to claim 1 in combination with an operating lamp attached to one arm, wherein said matching surfaces are lapped.

4. Joint according to claim 1, wherein the matching surfaces are ground.

5. Joint according to claim 1, wherein one of said arms is spring-loaded to support a load at the other end;
- a spring (6);
- means are provided to adjust compression of the spring, said means including a sector-shaped element (7) included in the attachment section of the arm;
- a push link (22) having one end pivotally mounted (8) on said sector-shaped element, offset from said shaft (16) and the other end bearing against said spring;
- and means adjustably fixing the position of said sector-shaped element within the attachment section to adjust the offset of the pivotal mounting of said push link and thus spring tension.

6. Joint according to claim 1, wherein the matching surfaces are lapped.